United States Patent
Hur et al.

(10) Patent No.: US 10,198,138 B2
(45) Date of Patent: Feb. 5, 2019

(54) CONDUCTIVE FILM FOR TOUCH PANEL, AND TOUCH PANEL AND DISPLAY APPARATUS INCLUDING THE SAME

(71) Applicant: LG ELECTRONICS INC., Seoul (KR)

(72) Inventors: Yangwook Hur, Seoul (KR); Junghoon Lee, Seoul (KR); Minchul Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 125 days.

(21) Appl. No.: 15/185,936

(22) Filed: Jun. 17, 2016

(65) Prior Publication Data

US 2016/0370903 A1    Dec. 22, 2016

(30) Foreign Application Priority Data

Jun. 19, 2015    (KR) ................. 10-2015-0087752

(51) Int. Cl.
*G06F 3/045*    (2006.01)
*G06F 3/044*    (2006.01)

(52) U.S. Cl.
CPC .............. *G06F 3/045* (2013.01); *G06F 3/044* (2013.01); *G06F 2203/04103* (2013.01); *G06F 2203/04112* (2013.01)

(58) Field of Classification Search
CPC ........................ G06F 3/045; G06F 2203/04103
USPC ..................................................... 345/174
See application file for complete search history.

(56) References Cited

U.S. PATENT DOCUMENTS

| 9,491,853 | B2 * | 11/2016 | Gaynor .................. B82Y 10/00 |
| 2007/0065651 | A1 * | 3/2007 | Glatkowski ............ B82Y 30/00 |
| | | | 428/297.4 |
| 2011/0102370 | A1 | 5/2011 | Kono et al. |
| 2011/0281070 | A1 * | 11/2011 | Mittal ............... H01L 31/02246 |
| | | | 428/142 |
| 2014/0028569 | A1 * | 1/2014 | Guard ..................... G06F 3/044 |
| | | | 345/173 |
| 2014/0198266 | A1 | 7/2014 | Park et al. |
| 2014/0238833 | A1 * | 8/2014 | Virkar ................ H03K 17/9622 |
| | | | 200/600 |

(Continued)

FOREIGN PATENT DOCUMENTS

| CN | 104020882 A | 9/2014 |
| CN | 203930737 U | 11/2014 |
| WO | WO 2014/204206 A1 | 12/2014 |

*Primary Examiner* — Benyam Ketema
(74) *Attorney, Agent, or Firm* — Birch, Stewart, Kolasch & Birch, LLP

(57) ABSTRACT

Discussed is a touch panel including a base film, a first electrode formed on one surface of the base film, the first electrode being provided with a first sensor part including a first conductor, and a second electrode formed on the other surface of the base film, the second electrode being provided with a second sensor part including a second conductor different from the first conductor. The first sensor part has a higher resistance than a resistance of the second sensor part. A first area ratio, which is a ratio of an area, in which the first sensor part is formed, to an area inside an outer edge of the first sensor part is greater than a second area ratio, which is a ratio of an area, in which the second sensor part is formed, to an area inside an outer edge of the second sensor part.

23 Claims, 9 Drawing Sheets

(56) References Cited

U.S. PATENT DOCUMENTS

| | | | |
|---|---|---|---|
| 2014/0290992 A1* | 10/2014 | Hur | G06F 3/044 |
| | | | 174/257 |
| 2014/0293151 A1 | 10/2014 | He | |
| 2014/0333555 A1* | 11/2014 | Oh | G06F 3/044 |
| | | | 345/173 |
| 2015/0014023 A1* | 1/2015 | Kim | H05K 1/097 |
| | | | 174/251 |
| 2015/0068790 A1* | 3/2015 | Kim | G06F 3/0416 |
| | | | 174/253 |
| 2015/0109238 A1* | 4/2015 | Chen | G06F 3/046 |
| | | | 345/174 |
| 2015/0118508 A1* | 4/2015 | Shin | H01B 1/22 |
| | | | 428/457 |

* cited by examiner

CONDUCTIVE FILM FOR TOUCH PANEL, AND TOUCH PANEL AND DISPLAY APPARATUS INCLUDING THE SAME

CROSS-REFERENCE TO RELATED APPLICATION

This application claims the priority benefit of Korean Patent Application No. 10-2015-0087752, filed on Jun. 19, 2015 in the Korean Intellectual Property Office, the disclosures of which is incorporated herein by reference in its entirety.

BACKGROUND OF THE INVENTION

Field of the Invention

Embodiments of the present invention relate to a conductive film for a touch panel, and a touch panel and a display apparatus including the same and, more particularly, to a conductive film for a touch panel having an improved configuration, and a touch panel and a display apparatus including the same.

Description of the Related Art

Recently, touch panels have been applied to various electronic apparatuses such as, for example, display apparatuses, for the sake of user convenience. Such a touch panel may include a first conductive film provided with a first electrode and a second conductive film provided with a second electrode, which serve to sense a touch, a cover glass substrate which is disposed at an uppermost layer over the front side of the first and second conductive films to constitute an outer surface, and adhesive layers for bonding therebetween.

In the touch panel as described above, when the first conductive film provided with the first electrode and the second conductive film provided with the second electrode are formed separately, the touch panel is required to have a complicated stack structure and be thick and heavy. In addition, the manufacturing costs of the touch panel increase, which may deteriorate price competitiveness.

SUMMARY OF THE INVENTION

Therefore, the embodiments of the present invention have been made in view of the above problems, and it is an object of the embodiments of the present invention to provide a conductive film for a touch panel, which enables the manufacture of a touch panel having a simplified structure at low manufacturing costs, and a touch panel and a display apparatus including the same.

In accordance with an embodiment of the present invention, the above and other objects can be accomplished by the provision of a touch panel including a base film, a first electrode formed on one surface of the base film, the first electrode being provided with a first sensor part including a first conductor, and a second electrode formed on the other surface of the base film, the second electrode being provided with a second sensor part including a second conductor different from the first conductor, wherein the first sensor part has a higher resistance than a resistance of the second sensor part, and wherein a first area ratio, which is a ratio of an area, in which the first sensor part is formed, to an area inside an outer edge of the first sensor part is greater than a second area ratio, which is a ratio of an area, in which the second sensor part is formed, to an area inside an outer edge of the second sensor part.

BRIEF DESCRIPTION OF THE DRAWINGS

The above and other objects, features and other advantages of the embodiments of the present invention will be more clearly understood from the following detailed description taken in conjunction with the accompanying drawings, in which.

DETAILED DESCRIPTION OF THE EMBODIMENTS

Figure 1:
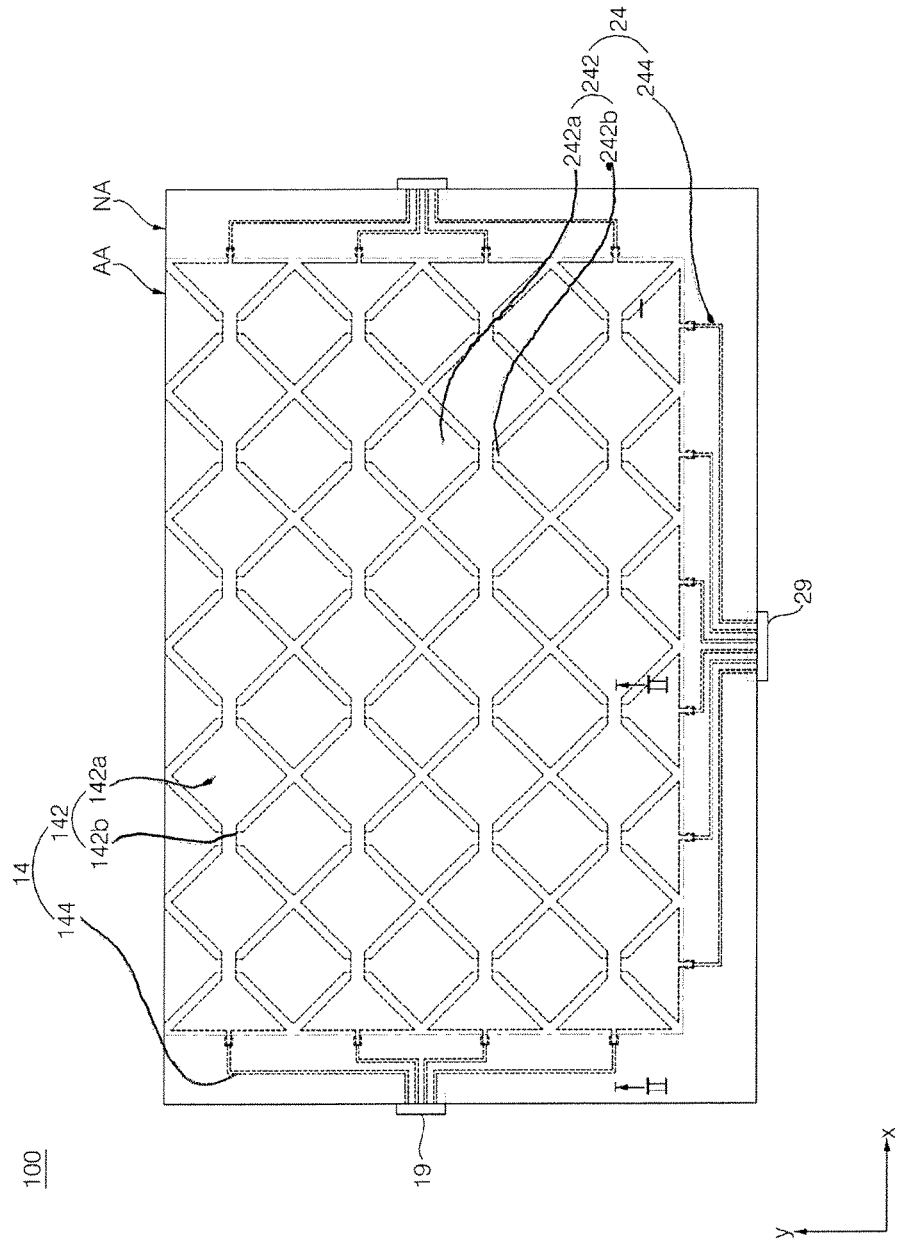
FIG. 1 is a plan view illustrating a touch panel according to one embodiment of the present invention.

Hereinafter, embodiments of the present invention will be described in detail with reference to the accompanying drawings. However, it will be understood that the present invention is not limited to these embodiments and various modifications thereof are possible.

In the drawings, parts not related to the description of the embodiments of the present invention are not illustrated for a clear and brief description of the embodiments of the present invention, and the same reference numerals are used throughout the specification to refer to the same or considerably similar parts. In addition, thicknesses, widths and the like are exaggerated or reduced in the drawings for clarity of description, and thicknesses, widths and the like of the embodiments of the present invention are not limited to the illustration of the drawings.

It will be further understood that, throughout this specification, when one element is referred to as "comprising" another element, the term "comprising" specifies presence of another element but does not preclude presence of other additional elements, unless context clearly indicates otherwise. Additionally, it will be understood that when one element such as a layer, a film, a region or a plate is referred to as being "on" another element, the one element may be directly on the another element, and one or more intervening elements may also be present. In contrast, when one element such as a layer, a film, a region or a plate is referred to as being "directly on" another element, one or more intervening elements are not present.

Hereinafter, a conductive film for a touch panel, which enables the fabrication of a touch panel having a simplified structure and is capable of reducing the manufacturing costs of the touch panel, and a touch panel and a display apparatus including the same will be described in detail with reference to the accompanying drawings.

Figure 2:
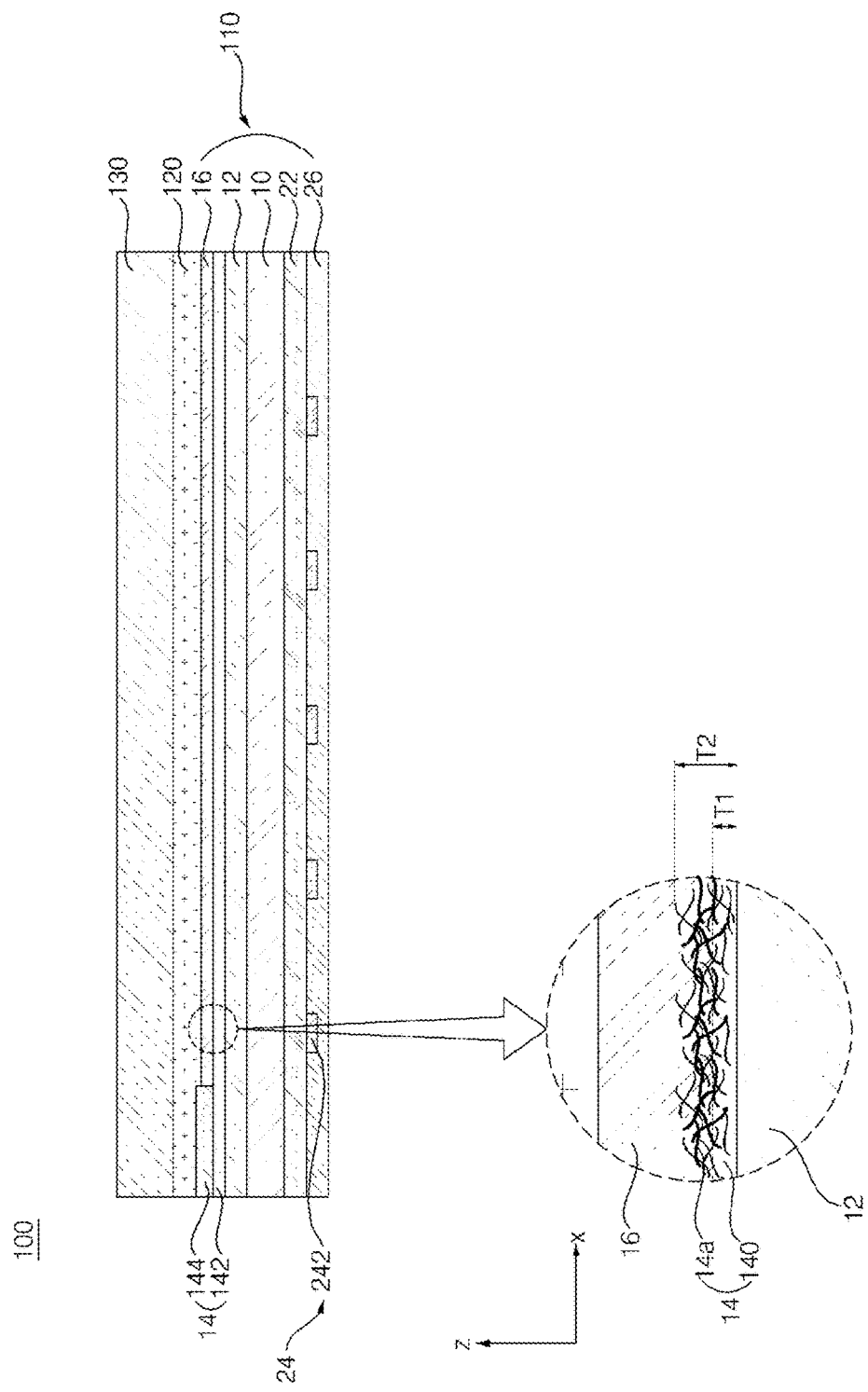
FIG. 2 is a schematic sectional view taken along line II-II of FIG. 1.

FIG. 1 is a plan view illustrating a touch panel according to one embodiment of the present invention, and FIG. 2 is a schematic sectional view taken along line II-II of FIG. 1. For clear and brief illustration, in FIG. 1, first and second electrodes 14 and 24 are mainly illustrated.

Referring to FIGS. 1 and 2, a touch panel, designated by reference numeral 100, according to the present embodiment may include an active area AA and a non-active area NA located around the active area AA. The active area AA is an area in which sensor parts 142 and 242 of first and second electrodes 14 and 24 are arranged to sense a touch of the user's hand or an input device such as, for example, a stylus pen. The non-active area NA is an area in which, for example, flexible printed circuit boards (FPCBs) 19 and 29, which are connected to an external component (external circuit, for example, a touch control unit that controls the touch panel 100 of a display apparatus) for transmission of information sensed in the active area AA, and wiring parts 144 and 244 of the first and second electrodes 14 and 24 connected to the FPCBs 19 and 29 are arranged. In addition, for example, a bezel or a black printed layer, which serves to physically secure, for example, various layers and elements constituting the touch panel 100 and to cover these and various other elements arranged in the non-active area NA, may be arranged in the non-active area NA. The present embodiment illustrates the non-active area NA as being formed around the outer periphery of the active area AA. However, the embodiment of the present invention is not limited thereto, and various other modifications are possible, for example, the non-active area NA may be not visible in a front view or a plan view.

The touch panel 100 according to the present embodiment includes a conductive film 110 which is provided at one surface thereof with the first sensor part 142 (and, additionally, the first wiring part 144) of the first electrode 14 and at the other surface thereof with the second sensor part 242 (and, additionally, the second wiring part 244) of the second electrode 24. At this time, for example, the resistances of the first and second sensor parts 142 and 242, the areas in which the first and second sensor parts 142 and 242 are formed, and the filling densities of conductors 14a and 24a in the first and second sensor parts 142 and 242 may vary in order to simplify the structure of the touch panel 100 or the conductive film 110 and to improve the characteristics of the touch panel 100. This will be described below in more detail. In addition, the touch panel 100 may further include a cover substrate 130, and a transparent adhesive layer 120 which attaches the cover substrate 130 and the conductive film 110 to each other. However, the cover substrate 130 and the transparent adhesive layer 120 are not necessary, and various other modifications are possible.

The cover substrate 130 may be formed of a material which may protect the touch panel 100 from external shock and allow light to be transmitted through the touch panel 100. For example, the cover substrate 130 may be formed of glass or plastic. However, the embodiment of the present invention is not limited thereto, and various other modifications with regard to, for example, the constituent material of the cover substrate 130 are possible.

The transparent adhesive layer 120 may be interposed between (i.e. may come into contact with) the cover substrate 130 and the conductive film 110, so as to bond them to each other. As the touch panel 100 may be fabricated through the use of the single transparent adhesive layer 120 described above, the stack structure of the touch panel 100 may be simplified.

The transparent adhesive layer 120 may be formed of a material that is adhesive in order to allow layers disposed on both sides thereof to be attached thereto and may also be translucent and, more particularly, may be formed of an optically clear adhesive (OCA). The optically clear adhesive has excellent adhesive force as well as high moisture tolerance, heat resistance, and processibility so as to prevent deterioration of the first and/or second electrode 14 and/or 24. The transparent adhesive layer 120 may be formed of any of various known optically clear adhesives.

The conductive film 110 includes a base film 10, the first electrode 14 formed on one surface of the base film 10, and the second electrode 24 formed on the other surface of the base film 10. In addition, the conductive film 110 may include a first hard coating layer 12 interposed between the base film 10 and the first electrode 14, an over-coating layer 16 disposed to cover the first electrode 14 and the base film 10 (more particularly, the first hard coating layer 12) at least in the active area AA, a second hard coating layer 22 interposed between the base film 10 and the second electrode 24, and an insulation layer 26 disposed to cover the second electrode 24 and the base film 10 (more particularly, the second hard coating layer 22).

The first hard coating layer 12 is formed on one surface of the base film 10. In the present embodiment, the first hard coating layer 12 may be interposed between the base film 10 and the first electrode 14 in order to improve various characteristics of the first electrode 14. This will be described below in detail after first describing the first electrode 14 and the over-coating layer 16.

At this time, the first electrode 14 may include the first sensor part 142, which is located in the active area AA, and the first wiring part 144, which is located in the non-active area NA and is electrically connected to the first sensor part 142. In addition, the second electrode 24 may include the second sensor part 242, which is located in the active area AA, and the second wiring part 244, which is located in the non-active area NA and is electrically connected to the second sensor part 242.

The base film 10 may take the form of a film or sheet, for example, which is formed of a material that has light transmittance and insulation and maintains the mechanical strength of the conductive film 110. The base film 10 may be formed of at least one of polyethylene, polypropylene, polyethylene terephthalate, polyethylene-2,6-naphthalate, polypropylene terephthalate, polyimide, polyamideimide, polyethersulfone, poly etheretherketone, polycarbonate, polyarylate, cellulose propionate, polyvinyl chloride, polyvinylidene chloride, polyvinyl alcohol, polyetherimide, polyphenylene sulfide, polyphenylene oxide, polystyrene and the like. For example, the base film 10 may be formed of polyethylene terephthalate. However, the embodiment of the present invention is not limited thereto, and the base film 10 may be formed of any of various other materials excluding the aforementioned materials.

The first sensor part 142 includes first sensor portions 142a and first connecting portions 142b that connect respective neighboring first sensor portions 142a to each other. The first sensor portions 142a have a greater width than a width of the first connecting portions 142b and substantially serve to sense a touch of an input device or the user's finger. FIG. 1 illustrates that the first sensor portions 142a have a diamond shape and occupy a wide area in the active area AA, along with second sensor portions 242a of the second sensor part 242, to effectively sense the touch. However, the embodiment of the present invention is not limited thereto, and the first sensor portions 142a may have any of various other shapes such as, for example, polygonal shapes including triangular and rectangular shapes, a circular shape, or an oval shape. In addition, the number of intersections at which a plurality of electrode portions 240 cross each other in the second sensor part 242 may range from 3 to 50 per mm2. However, the embodiment of the present invention is not limited thereto, and various other modifications with regard to the number of intersections of the electrode portions 240 are possible.

The first connecting portions 142b connect the first sensor portions 142a to one another in a first direction (the horizontal direction of FIG. 1 or the X-axis of FIG. 1). As such, the first sensor part 142 may extend a long length in the first direction in the active area AA.

In the present embodiment, the first sensor part 142 comprises a transparent conductive material that exhibits conductivity and light transmittance. For example, the first sensor part 142 may include first conductors 14a, which are formed of a metal nano material having a network structure (for example, metal nano-wires such as, for example, silver nano-wires, copper nano-wires, or platinum nano-wires, most preferably, silver nano-wires). Here, the network structure may be understood as a structure in which neighboring nano-material conductors such as, for example, nano-wires, are meshed at contact points thereof to form, for example, an irregular net structure or an irregular mesh structure, thereby achieving electrical connection via the contact points. This will be described below in more detail with reference to FIGS. 3 and 4.

Figure 3:
FIG. 3 is a photograph of a first conductor provided at a first sensor part of the touch panel according to the embodiment of the present invention.
Figure 4:
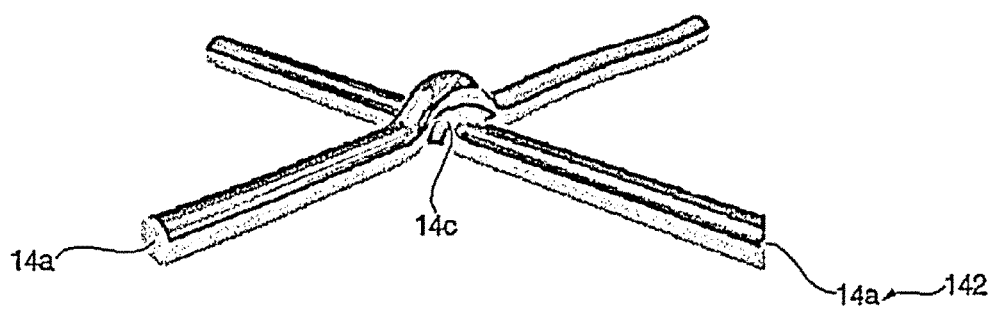
FIG. 4 is a perspective view schematically illustrating the nano-material first conductor, which configures a network structure, provided at the first sensor part of the touch panel according to the embodiment of the present invention.

FIG. 3 is a photograph of the first conductor 14a of the first sensor part 142 of the touch panel according to the embodiment of the present invention, and FIG. 4 is a perspective view schematically illustrating the nano-material first conductor 14a, which configure a network structure, provided at the first sensor part 142 of the touch panel according to the embodiment of the present invention. Referring to FIGS. 3 and 4, in the present embodiment, the first conductors 14a, which are formed of nano-wires, are distributed in the first sensor part 142, and come into contact with each other at contact points 14c so as to be electrically connected to one another.

Referring again to FIG. 2, the first sensor part 142, which includes the nano-material first conductors 14a configuring a network structure, may be formed in such a way that the nano-material first conductors 14a are located in a layer having an even thickness, or such that voids are defined between the nano-material first conductors 14a. In practice, the first sensor part 142 is formed by applying a mixture of the nano-material first conductors 14a and, for example, an extremely small amount of a solvent or binder. As such, in the first sensor part 142, a residual portion 140, which is formed of a solvent or binder residue and comprises a resin, is formed into a relatively thin first thickness T1, and the first conductors 14a extend to the outside of the residual portion 140. With this configuration, the network structure, configured by the first conductors 14a, may have a relatively thick second thickness T2. In the following, the thickness of the first sensor part 142 is not the first thickness T1 of the residual portion 140, but refers to the overall thickness of the residual portion 140 and the layer of the first conductors 14a protruding upward from the residual portion 140, i.e. the second thickness T2.

As described above, in the present embodiment, the first sensor part 142 includes the nano-material first conductors 14a configuring a network structure, which may reduce material costs and improve various characteristics. The first sensor part 142 will be described later in more detail.

The first wiring part 144 is located in the non-active area NA. The first wiring part 144 may extend a long length and be connected to the first flexible printed circuit board 19. In the present embodiment, the structure and material of the first wiring part 144 may be, for example, different from those of the first sensor part 142, and this will be described later in detail.

In the present embodiment, the first wiring part 144 may be formed on a portion of the first sensor part 142 that is exposed by removing the over-coating layer 16, so as to come into contact with the exposed portion of the first sensor part 142. In the process of patterning the first electrode 14, the over-coating layer 16 having a small thickness may be easily removed at the location at which the first wiring part 144 is to be disposed. Alternatively, after a metal paste (for example, a silver paste) for forming the first wiring part 144 is applied, the over-coating layer 16 having a small thickness may be naturally removed in the process of firing the applied metal paste. However, the embodiment of the present invention is not limited thereto. Thus, the over-coating layer 16 may be removed by, for example, an additional patterning process. In addition, the first wiring part 144 may be placed in the same plane as the first sensor part 142 such that side surfaces of the first wiring part 144 and the first sensor part 142 come into contact with each other. Alternatively, the first wiring part 144 may be located above the first sensor part 142 with the over-coating layer 16 interposed therebetween, so as to be electrically connected to the first sensor part 142. Various other modifications are possible.

The first wiring part 144 may be connected to the first flexible printed circuit board 19 for external connection. The first flexible printed circuit board 19 may include a base member and a wiring part formed on the base member. As the wiring part of the first flexible printed circuit board 19 and the first wiring part 144 come into contact with each other, the first wiring part 144 and the first flexible printed circuit board 19 may be electrically connected to each other. However, the embodiment of the present invention is not limited thereto, and a conductive adhesive member such as, for example, an anisotropic conductive adhesive (ACA), an anisotropic conductive paste (ACP), or an anisotropic conductive film (ACF) may be located between the wiring part of the first flexible printed circuit board 19 and the first wiring part 144 so as to electrically connect the same to each other.

FIG. 1 illustrates that two first wiring parts 144 are located respectively at both ends of the first sensor part 142 to achieve a double routing structure. This serves to reduce the resistance of the first sensor part 142, which has a relatively long length, thereby preventing any loss due to resistance. However, the embodiment of the present invention is not limited thereto, and any of various other structures, for example, a single routing structure in which the first wiring part 144 is connected to only one side of the first sensor part 142, is possible.

In addition, FIG. 1 illustrates that the first wiring parts 144 are connected to any external component via two non-active areas NA located at both sides of the active area AA. However, the embodiment of the present invention is not limited thereto and the first wiring parts 144 may be connected to the external component via a single non-active area NA located at one side of the active area AA, or may extend to any one of upper and lower sides of the active area AA so as to be connected to the external component via the corresponding side of the active area AA. Various other modifications are possible.

The over-coating layer 16, which is disposed on one surface of the base film 10 to cover the base film 10 and the first sensor part 142, serves to physically and chemically protect the first sensor part 142. More specifically, the over-coating layer 16 is configured to enclose the outer surfaces of the first conductors 14a, which extend out of the residual portion 140, in order to prevent damage to the first conductors 14a or oxidation of the first conductors 14a. More specifically, the over-coating layer 16 may physically protect the first conductors 14a, which protrude upward from the residual portion 140, in order to prevent the first conductors 14a from being bent by, for example, external force. In addition, since the first conductors 14a may be oxidized when exposed to outside air for a long time, thus exhibiting reduced electrical conductivity, the over-coating layer 16 may be formed to cover the first conductors 14a in order to prevent the above-described problem. In the present embodiment, in consideration of the fact that the first sensor part 142 includes the nano-material first conductors 14a configuring a network structure, the over-coating layer 16 capable of improving the physical stability of the first conductors 14a and preventing oxidation of the first conductors 14a is provided. For example, a portion of the over-coating layer 16 may be introduced into voids between the first conductors 14a to fill the voids, and the remaining portion of the over-coating layer 16 may be present above the first conductors 14a. Unlike the present embodiment, even in the case where the first conductors 14a are included in the residual portion 140 rather than protruding upward from the residual portion 140, the over-coating layer 16 may prevent the first conductors 14a from being oxidized by, for example, outside air introduced into the residual portion 140. To this end, the over-coating layer 16 may be formed to directly come into contact with the first sensor part 142 or the first conductors 14a.

The over-coating layer 16 may be entirely formed on the base film 10 so as to cover the first sensor part 142. Here, the term "entirely formed" may refer not only to complete formation without empty regions, but also to formation with inevitable omission of some portions.

The over-coating layer 16 as described above may be formed of a resin. For example, the over-coating layer 16 may be formed of an acrylic resin. However, the embodiment of the present invention is not limited thereto, and the over-coating layer 16 may be formed of any of various other materials. In addition, the over-coating layer 16 may be formed to cover the entire first sensor part 142 via any of various coating methods.

The thickness of the over-coating layer 16 may be less than the thickness of the first or second hard coating layer 12 or 22. For example, the thickness of the over-coating layer 16 may range from 5 nm to 50 nm. When the thickness of the over-coating layer 16 is below 5 nm, the over-coating layer 16 may fail to sufficiently prevent oxidation of the first conductors 14a. When the thickness of the over-coating layer 16 exceeds 50 nm, material costs may increase. However, the embodiment of the present invention is not limited thereto and the thickness of the over-coating layer 16 may vary to various other values.

The drawings and the above-described embodiment illustrate that the residual portion 140 of the first sensor part 142 and the over-coating layer 16 are configured as different layers. However, the embodiment of the present invention is not limited thereto. In another embodiment, by applying, for example, ink that is a mixture of constituent materials of the first conductors 14a and the residual portion 140 of the first sensor part 142 and the over-coating layer 16 described above, the first conductors 14a may be included in the single over-coating layer 16. Of course, various other modifications are possible.

Next, the first hard coating layer 12 located between the base film 10 and the first electrode 14 will again be described. As described above, in the present embodiment, since the first conductors 14a of the first sensor part 142 are formed of nano materials having a network structure, the conductive film 110 or a structure for forming the same may be easily damaged by external force during movement for coating. That is, in the present embodiment, even if a small external force is applied to the conductive film 110, this has an effect on the contact characteristics between nano materials (for example, nano wires) that configure a network structure, which may vary the electrical conductivity of the first sensor part 142. Accordingly, in the present embodiment, the first hard coating layer 12, which has a relatively high hardness (i.e. a higher hardness than the first electrode 14 and the over-coating layer 16) may be located between the base film 10 and the first electrode 14 (more particularly, the first sensor part 142), so as to increase the hardness of the entire conductive film 110. In this way, even if external force is applied to the conductive film 110, the first conductors 14a inside the first sensor part 142 may maintain enhanced contact characteristics.

In addition, the base film 10 has an uneven upper surface having a relatively high surface roughness. This uneven surface of the base film 10 may increase diffuse reflections. At this time, in the case where the first conductors 14a having a network structure are applied in the present embodiment, the occurrence of diffuse reflections may be worsened by, for example, the network structure, which may increase haze (turbidity) and deteriorate light transmissivity. In addition, in the case where the first sensor part 142 is formed on the rough surface of the base film 10 described above, it is difficult to impart a constant thickness to the first sensor part 142 formed of nano materials having a network structure. Consequently, there may occur a non-coated region and the first sensor part 142 may exhibit increased deviation in sheet resistance.

In the present embodiment, in consideration of the above-described problems, the first hard coating layer 12 is entirely applied to the base film 10 for planarization of the upper surface of the base film 10. That is, the upper surface of the first hard coating layer 12 may have a lower surface roughness than that of the upper surface of the base film 10 (or the lower surface of the first hard coating layer 12). Planarization of the surface of the base film 10 by the first hard coating layer 12 may minimize haze and diffuse reflections and maximize light transmissivity. Consequently, the optical characteristics of the conductive film 110 may be improved. In addition, the coating characteristics of the first electrode 14 (for example, the first sensor part 142) may be improved. In this way, the deviation of various characteristics such as, for example, the sheet resistance and optical characteristics of the first sensor part 142 may be minimized.

The first hard coating layer 12 may comprise various materials which are capable of increasing the hardness and improving the coating characteristics of the first sensor part 142. For example, the first hard coating layer 12 may comprise at least one of a urethane based resin, melamine based resin, alkyd based resin, epoxy based resin, acryl based resin, polyester based resin, polyvinyl alcohol based resin, vinyl chloride based resin, vinylidene chloride based resin, polyarylate based resin, sulfone based resin, amide based resin, imide based resin, polyether sulfone based resin, polyether imide based resin, polycarbonate based resin, silicon based resin, fluorine based resin, polyolefin based resin, styrene based resin, vinyl pyrrolidone based resin, cellulose based resin, acrylonitrile based resin and the like. In particular, in the present embodiment, the first hard coating layer 12 may include an acryl based resin. However, the embodiment of the present invention is not limited thereto, and the first hard coating layer 12 may be formed of any of various other materials.

The first hard coating layer 12 may have a pencil hardness of 1H to 5H. When the pencil hardness of the first hard coating layer 12 is below 1H, it may be difficult to sufficiently achieve the above-described effects. When the pencil hardness of the first hard coating layer 12 exceeds 5H, the manufacture of the first hard coating layer 12 may be difficult. In addition, the first hard coating layer 12 may have a water contact angle of 40° to 60° and a surface tension of 20 dyne/cm to 50 dyne/cm. The contact angle and surface tension of the first hard coating layer 12 may have lower values than the contact angle and surface tension of another layer (for example, the base film 10 or a primer layer interposed between the base film 10 and the first hard coating layer 12). As such, the first sensor part 142 may be easily formed on the first hard coating layer 12.

The thickness of the first hard coating layer 12 may be determined so as to enable the planarization of the surface of the conductive film 110 while increasing the hardness of the conductive film 110. To this end, the first hard coating layer 12 may have a greater thickness than those of the first sensor part 142 and the over-coating layer 16. However, since the thickness of the conductive film 110 may unnecessarily increase when the thickness of the first hard coating layer 12 is excessively increased, the first hard coating layer 12 may have a smaller thickness than the thickness of the base film 10.

For example, the thickness of the first hard coating layer 12 may range from 1 μm to 10 μm. When the thickness of the first hard coating layer 12 is below 1 μm, it may be difficult to sufficiently achieve the effects of the first hard coating layer 12 described above. When the thickness of the first hard coating layer 12 exceeds 10 μm, the material costs increase and a reduction in thickness may be difficult. In sufficient consideration of the effects and thickness reduction of the first hard coating layer 12, the thickness of the first hard coating layer 12 may range from 3 μm to 5 μm. However, the embodiment of the present invention is not limited thereto, and the first hard coating layer 12 may have a different thickness.

Meanwhile, the second hard coating layer 22 may further be disposed on the other surface of the base film 10. The second hard coating layer 22 serves to protect the conductive film 110 from damage (e.g., scratches) that may be generated during processing. In the present embodiment, the second electrode 24 is formed after the first electrode 14 is formed over the second hard coating layer 22. The second hard coating layer 22 may serve to prevent damage to the base film 10 when forming or patterning the first electrode 14 prior to forming the second electrode 24.

Various characteristics of the second hard coating layer 22 such as, for example, the material and thickness thereof may be identical to or extremely similar to those of the first hard coating layer 12, and thus a detailed description thereof will be omitted herein. As a result of providing both the first and second hard coating layers 12 and 22 described above, the conductive film 110 according to the present embodiment may have a pencil hardness of 2H or more (for example, within a range from 2H to 10H).

The second electrode 24, which is located on the other surface of the base film 10 (more particularly, on the second hard coating layer 22), may include the second sensor part 242, which includes the second sensor portions 242a and second connecting portions 242b configured to connect respective neighboring second sensor portions 242a to each other within the active area AA, and the second wiring part 244 which extends from the second sensor portions 242a or the second connecting portions 242b within the active area AA to thereby be located in the non-active area NA.

The second connecting portions 242b connect the second sensor portions 242a in a second direction (the vertical direction of FIG. 1 or the Y-axis of FIG. 1) to allow the second electrode 24 to be longitudinally located in the second direction in the active area AA. The description of the first sensor part 142 may also be applied directly to the second sensor part 242 except for the direction in which the second sensor part 242 extends. The second wiring part 244 is located on the second hard coating layer 22 in the non-active area NA. The second wiring part 244 may extend a long length to thereby be connected to the second flexible printed circuit board 29.

FIG. 1 illustrates the second wiring part 244 as having a single routing structure. As such, the second wiring part 244 is formed in the non-active area NA that is located at the lower side of the active area AA. However, the embodiment of the present invention is not limited thereto, and the second wiring part 244 may be located at the upper side, the lower side, the left side and/or the right side of the active area AA, and various other modifications are possible.

The description of the first wiring part 144 and the first flexible printed circuit board 19 may be directly applied to the second wiring part 244 and the second flexible printed circuit board 29, and thus a detailed description of the second wiring part 244 and the second flexible printed circuit board 29 will be omitted herein.

The insulation layer 26 may be disposed on the other surface of the base film 10 to cover the second hard coating layer 22 and the second electrode 24. The insulation layer 26 serves to configure the outer surface of the touch panel 100 for protection of the touch panel 100. The insulation layer 26 may be formed of a material having a pencil hardness of F or more (for example, an acryl resin), and may have a greater thickness than that of the over-coating layer 16 (for example, 1 μm or more, and more specifically, within a range from 1 μm to 20 μm). In addition, the insulation layer 26 may have a lower dielectric coefficient than the over-coating layer 16. For example, the dielectric coefficient of the insulation layer 26 may range from 1 to 3, and the dielectric coefficient of the over-coating layer 16 may range from 3 to 4. Since the insulation layer 26 is located between the conductive film 110 and a display panel (reference numeral 212 of FIG. 9), providing the insulation layer 26 with a low dielectric coefficient serves to prevent noise generated by the display panel 212 from being transmitted to the conductive film 110 which functions to sense a touch. However, the embodiment of the present invention is not limited thereto, and various modifications with regard to, for example, the material, pencil hardness, and thickness of the insulation layer 26 are possible.

Although FIG. 2 illustrates the insulation layer 26 as being disposed on the second electrode 24, in the case where the second electrode 24 is disposed toward the cover substrate 130 and the first electrode 14 is located opposite to the second electrode 24, the insulation layer 26 may be located between the first electrode 14 and the over-coating layer 16. However, the insulation layer 26 is not necessary.

As described above, in the present embodiment, various characteristics may be improved by providing the first sensor part 142 of the first electrode 14 with the nano-material first conductors 14a that configure a network structure. However, it may be difficult in terms of processing to form the second electrode including the same conductors on the other surface of the base film 10 formed with the first electrode 14 including the first conductors 14a, and the problems that may be caused by the first conductors 14a may be aggravated. More specifically, the first sensor part 142 including the first conductors 14a may exhibit inexpensive material costs and good light transmissivity, but may easily undergo deterioration in electrical connection characteristics due to, for example, external shocks and may suffer from considerable diffuse reflections. In the case where the second sensor part 242 including additional first conductors 14a is formed on the base film 10 provided with the first sensor part 142 including the first conductors 14a, the electrical connection characteristics of the first sensor part 142 are deteriorated when the second sensor part 242 is formed, which increases the rate of defective products of the conductive film 110 and consequently may make it difficult to work the invention in practice. In addition, the diffuse reflections of the first and second sensors 142 and 242 including the first conductors 14a cause excessive reflection by the conductive film 110, which may problematically cause the user's eyes to perceive the first and second sensors 142 and 242.

In consideration of the problems described above, the second sensor part 242 has second conductors 24a having, for example, a structure and shape that are different from those of the first conductors 14a. In addition, the first and second wiring parts 144 and 244 for external connection may also have, for example, a structure and shape that are different from those of the first sensor part 142 and/or the second sensor part 242, which may further improve external connection characteristics.

Figure 5:
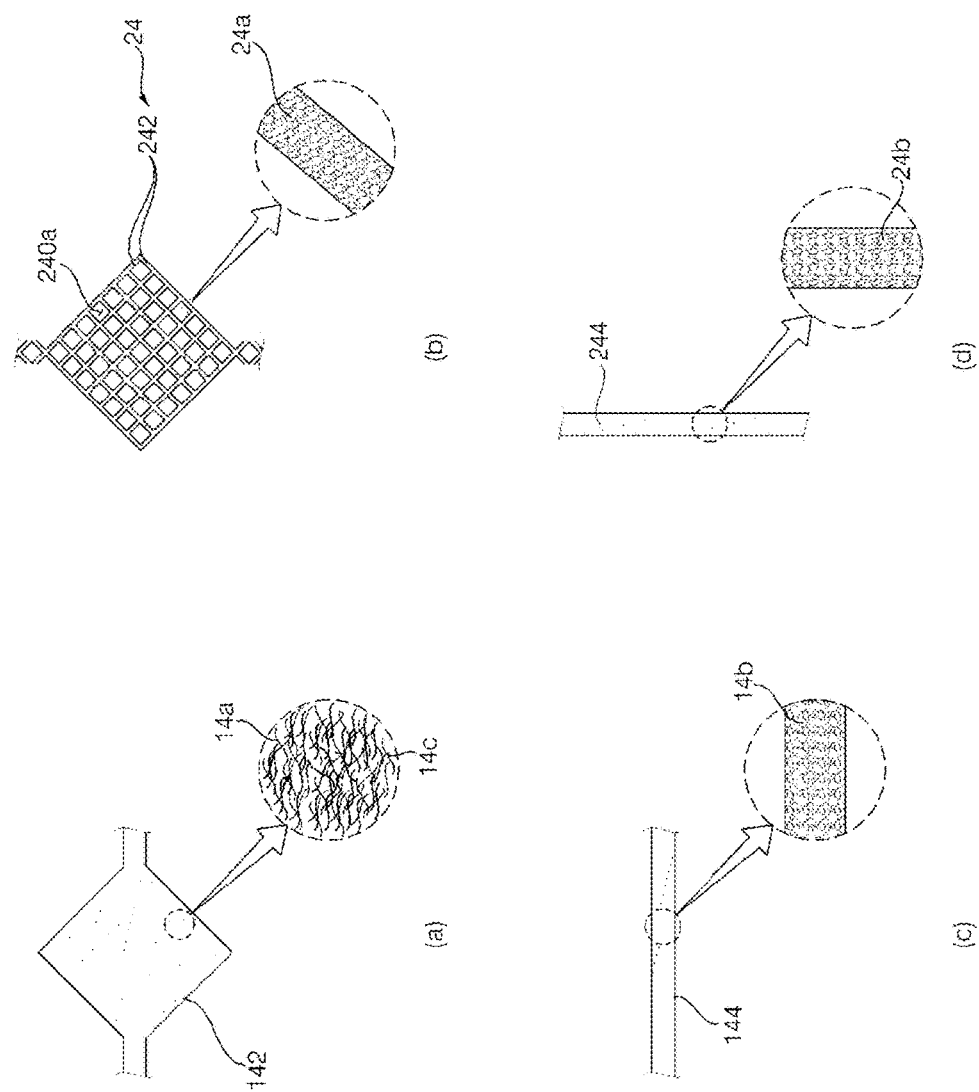
FIG. 5 shows views schematically illustrating a first sensor part, a second sensor part, a first wiring part, and a second wiring part according to the embodiment of the present invention.

FIG. 5 shows views schematically illustrating the first sensor part 142 ((a) of FIG. 5), the second sensor part 242 ((b) of FIG. 5), the first wiring part 144 ((c) of FIG. 5), and the second wiring part 244 ((d) of FIG. 5) according to the embodiment of the present invention.

Referring to (a) of FIG. 5, as described above, the first sensor part 142 is formed throughout an area corresponding to the first sensor part 142, and the first conductors 14a are arranged in the first sensor part 142 to come into contact with the first sensor part 142 at contact points 14c. As described above, the first conductors 14a configure a network structure, and thus are arranged not in a portion of the first sensor part 142, but in the entire first sensor part 142.

That is, the first sensor part 142 is formed, without, for example, an opening, throughout a sensor function area of the first electrode 14 (an area that functions as or is designed to function as the first sensor part 142, i.e., an area inside the outer edge of the first sensor part 142, which has a diamond shape, for example, in this embodiment, but other shapes may also be used). For example, the ratio of the area, in which the first sensor part 142 is formed, to the area inside the outer edge of the first sensor part 142 (i.e. the first area ratio) may be 95% or more (for example, within a range from 99% to 100%). That is, the opening ratio of the first sensor part 142 may be 5% or less (for example, within a range from 0% to 1%). This opening ratio of the first sensor part 142 may be the result of, for example, processing error. For example, and as previously described in relations to FIGS. 2 and 3, the first conductors 14a is formed in a network structure that have strands, fibers, wires or other filament-like elements that are meshed together. Between these elements may be little voids such as non-overlapping portions or gaps, whereby the first sensor part 142 including the first conductors 14a also includes the voids. Within an area defined as the first sensor part 142, the opening ratio (e.g., a ratio of the voids to a ratio of the first sensor part 142) may be 5% or less. Also, within the area defined as the first sensor part 142, the ratio of the area (e.g., a ratio of the first conductors 14a to a ratio of the first sensor part 142) may be 95% or more.

On the other hand, since the first conductors 14a are arranged to configure a network structure in the area where the first sensor part 142 is formed, the first conductors 14a are arranged not in a portion of the first sensor part 142, but in the entire first sensor part 142. For example, the filling density of the first conductors 14a in the area in which the first sensor part 142 is located may range from 1% to 30%. Here, the filling density may mean the density of the portion in which the first conductors 14a are formed within the portion in which the first sensor part 142 is formed when viewed in plan. Accordingly, the first conductors 14a may not be located in a range from 70% to 99% of the first sensor part 142 within the portion in which the first sensor part 142 is formed. When the filling density of the first conductors 14a is below 1%, the resistance of the first sensor part 142 may increase. When the filling density of the first conductors 14a exceeds 30%, the light transmissivity of the first sensor part 142 may be deteriorated. Through this filling density, the first sensor part 142 including the first conductors 14a may have high transparency.

For example, the number of the contact points 14c of the first conductors 14a in the first sensor part 142 may be 1,000 or more per mm2 (for example, within a range from 1,000 to 1,000,000 per mm2). When this number of contact points 14c is provided, the first sensor part 142 may attain low resistance and excellent electrical characteristics.

However, the embodiment of the present invention is not limited thereto, and, for example, the first area ratio, the filling density, and the number of contact points may have various other values.

At this time, the first conductors 14a, i.e. the nano-wires may have a long length and a relatively short width, thus exhibiting a large aspect ratio. For example, the first conductors 14a may have a width (short axis) within a range from 10 nm to 35 nm and a length (long axis) within a range from 20 μm to 40 μm. This range of large aspect ratio (for example, a range from 1:600 to 1:4000) may ensure the good formation of a network structure and prevent the first sensor part 142 from being easily perceived by the user.

The first sensor part 142 may be formed by wet coating which entails lower process costs than deposition. That is, the first sensor part 142 may be formed by forming an electrode layer via wet coating in which, for example, paste, ink, mixture, or a solution containing the nano-material first conductors 14a in the form of, for example, nano-wires, is applied, and subsequently patterning the formed electrode layer. At this time, the density of the nano-material first conductors 14a in the solution, mixture, or paste used in the wet coating is very low (for example, 1% or less). As such, costs required to form the first sensor part 142 may be reduced, resulting in improved productivity.

In addition, when the first sensor part 142 includes the nano-material first conductors 14a, the first sensor part 142 may have low resistance and excellent electrical characteristics as well as high light transmissivity. For example, silver nano-wires may be easily fabricated because the surfaces of silver (Ag) nano particles have several crystalline faces and thus can easily induce anisotropic growth. The silver nano-wires have a resistance of approximately 10 Ω/sq. to 400 Ω/sq., thus realizing low resistance (for example, within a range from 10 Ω/sq. to 150 Ω/sq.). As such, the first sensor part 142 having any resistance within a wide range may be formed. In particular, a first sensor part 142 having better electrical conductivity than indium tin oxide, which has a resistance in the approximate range from 200 Ω/sq. to 400 Ω/sq., may be formed. In addition, the silver nano-wires may have a superior light transmissivity to indium tin oxide, and for example may have a light transmissivity of 88% or more (for example, within a range from 88% to 92%). In addition, the silver nano-wires are flexible and thus may be applied to a flexible apparatus and ensure stable material supply.

The thickness of the first sensor part 142 may vary in various ways according to the size of the touch panel 100, the required resistance value, and the material of the first sensor part 142. At this time, the first sensor part 142 may have a minimum thickness when metal nano-wires having a network structure are included. For example, the first sensor part 142 may have a thickness of 200 nm or less (for example, within a range from 5 nm to 15 nm). This is because this thickness range ensures the fabrication of the first sensor part 142 having a desired resistance despite the small thickness thereof. As such, the surface roughness of the first sensor part 142 may also have a relatively low value (for example, within a range from 5 nm to 15 nm). However, the embodiment of the present invention is not limited thereto, and, for example, the thickness and surface roughness of the first sensor part 142 may have any of various values.

The first sensor part 142 has a relatively low specular reflectance (8° reflectance) and a relatively high diffuse reflectance (8° reflectance) because it includes the nano-material first conductors 14a that configure a network structure. For example, the specular reflectance of the first sensor part 142 may be within a range from 3% to 15% with respect to light having a wavelength of 380 nm to 780 nm, and the diffuse reflectance of the first sensor part 142 may be within a range from 2% to 10% with respect to light having a wavelength of 380 nm to 450 nm. However, the embodiment of the present invention is not limited thereto, and, for example, the specular reflectance and diffuse reflectance of the first sensor part 142 may have various other values.

The second sensor part 242 of the second electrode 24 includes the second conductors 24a different from the first conductors 14a. The second conductors 24a are not formed of nano-materials configuring a network structure, unlike the first conductors 14a. The second sensor part 242 may have a mesh structure that includes a plurality of electrode portions 240.

More specifically, referring to (b) of FIG. 5, the second sensor part 242 is partially formed in an area inside the outer edge of the second sensor part 242, and the second conductors 24a are distributed over the entire portion in which the second sensor part 242 is formed (i.e. inside the electrode portions 240). The electrode portions 240 including the second conductors 24a may be opaque because they have lower light transmissivity than that of the first sensor part 142, and the second sensor part 242 including a mesh structure of the electrode portions 240 may be perceived as being transparent.

That is, the electrode portions 240 are located so as to cross each other in a sensor function area of the second electrode 24 (an area that functions as or is designed to function as the second sensor part 242, i.e. the area inside the outer edge of the second sensor part 242), and openings 240a are formed in the area in which no electrode portions 240 are formed, and such openings 240a may be arranged periodically or randomly. Also, such openings 240a may have a certain shape or may have a random shape. As such, the ratio of the area, in which the second sensor part 242 (i.e. the electrode portions 240) is formed, to the area inside the outer edge of the second sensor part 242 (i.e. the second area ratio) may be less than the first area ratio. On the other hand, the second conductors 24a may be distributed over the entire area in which the second sensor part 242 is formed (i.e. the area where the electrode portions 240 are arranged). As such, the filling density of the second conductors 24a in the second sensor part 242 may be greater than the filling density of the first conductors 14a in the first sensor part 142. As described above, in the present embodiment, the second sensor part 242 includes the second conductors 24a, which have the greater filling density than that of the first conductors 14a distributed in the first sensor part 142, and the second area ratio of the second sensor part 242 is less than the first area ratio of the first sensor part 142. This may reduce the area in which the second sensor part 242 is formed, so as to allow the second sensor part 242 to have resistance similar to that of the first sensor part 142, which may result in considerably reduced material costs and improved light transmissivity of the second sensor part 242.

For example, the second area ratio may range from 0.01% to 5% (for example, range from 0.01% to 2%), and the opening ratio of the second sensor part 242 may range from 95% to 99.9% (for example, range from 98% to 99.99%). In addition, the filling density of the second conductors 24a may be 95% or more (for example, within a range from 99% to 100%). The second area ratio and filling density described above serve to adjust the resistances of the first sensor part 142 and the second sensor part 242 such that they are similar to each other and to reduce the material costs of the second sensor part 242. However, the embodiment of the present invention is not limited thereto, and, for example, the second area ratio and the filling density of the second conductors 24a may have various other values.

(b) of FIG. 5 illustrates that the electrode portions 240 of the second sensor part 242 are angled in the horizontal direction and vertical direction of the touch panel 100 to cross each other so as to create diamond-shaped openings 240a. However, the embodiment of the present invention is not limited thereto, and, for example, the shape of the electrode portions 240 and the shape of the openings 240a may vary in various ways. For example, the openings 240a may have a triangular, rectangular, parallelogrammatic, pentagonal, or any other irregular shape. In particular, a moiré phenomenon caused by the repetition of regular shapes may be prevented since the second sensor part 242 may not have a regular shape when the openings 240a have a pentagonal or irregular shape.

The second sensor part 242 described above may be formed by various methods. For example, the second sensor part 242 may be formed by forming an electrode layer via wet coating in which, for example, paste, ink, mixture, or a solution (hereinafter referred to as paste) containing a photosensitive material and the second conductors 24a is applied, and subsequently patterning and thermally treating the formed electrode layer via the implementation of, for example, exposing, developing, and etching processes. Alternatively, the second sensor part 242 may be formed by applying a patterned paste and drying and/or firing the paste. In this way, the second sensor part 242 may be formed without applying shocks to the base film 10 formed with the first sensor part 142 including the first conductors 14a.

The paste, used to form the second sensor part 242, may comprise a solvent, a photosensitive material, the second conductors 24a, and various other additives. The solvent may include, for example, a volatile alcohol based material or ester based material and may be within a range from 5 to 40 parts by weight per 100 parts by weight. The photosensitive material may include a thermosetting resin, and may be within a range from 5 to 20 parts by weight per 100 parts by weight. The second conductors 24a may include any of various metals and, for example, may include silver. The second conductors 24a may be within a range from 45 to 90 parts by weight per 100 parts by weight. The aforementioned contents are limited to enable the stable formation of the second sensor part 242 and to reduce the resistance of the second sensor part 242, and the embodiment of the present invention is not limited thereto.

The second conductors 24a may be formed of a plurality of metal particles, which come into contact with one another to compactly fill the area in which the second sensor part 242 is formed. The second conductors 24a may have any of various shapes, for example, a spherical or flake shape so as to be formed into a constant diameter or width. As such, the second conductors 24a may have a smaller aspect ratio than the first conductors 14a. For example, the diameter (or a long-axis width and a short-axis width) of the second conductors 24a may range from 100 nm to 300 nm, and may be greater than the width of the first conductors 14a, but less than the length thereof. In addition, the aspect ratio of the second conductors 24a may have a value of approximately 1. However, the embodiment of the present invention is not limited thereto, and, for example, the shape, diameter, and aspect ratio of the second conductors 24a may have various other values.

When the second sensor part 242 includes the second conductors 24a formed of metal particles as described above, the second sensor part 242 may attain considerably low resistance and excellent electrical characteristics. Accordingly, as described above, the second sensor part 242 may have low resistance even if the second area rate of the second sensor part 242 is reduced. For example, the sheet resistance of the second sensor part 242 may range from 1 Ω/sq. to 50 Ω/sq. In such a range, the second sensor part 242 may have a sufficiently low resistance without a great difference in the sheet resistance with the first sensor part 142. However, the embodiment of the present invention is not limited thereto, and the resistance of the second sensor part 242 may vary in various ways.

The thickness of the second sensor part 242 may vary in various ways according to the size of the touch panel 100, the required resistance value, and the material of the second sensor part 242. In the present embodiment, the second sensor part 242 is formed by applying a paste and may be thicker than the first sensor part 142. For example, the thickness of the second sensor part 242 may range from 0.5 μm to 2 μm. This is because the second sensor part 242 having the above-described thickness may attain a desired resistance via a simplified process and may be reduced in material costs. As such, the surface roughness of the second sensor part 242 may have a higher value than that of the first sensor part 142 (for example, within a range from 0.5 μm to 2 μm). However, the embodiment of the present invention is not limited thereto, and, for example, the thickness and surface roughness of the second sensor part 242 may have various other values.

The second sensor part 242 is formed of a metal layer filled with the second conductors 24a. Thus, the second sensor part 242 has a higher specular reflectance (8° reflectance) than that of the first sensor part 142 and lower diffuse reflectance (8° reflectance than that of the first sensor part 142. For example, the specular reflectance of the second sensor part 242 may be within a range from 8% to 20% with respect to light having a wavelength of 380 nm to 780 nm, and the diffuse reflectance of the second sensor part 242 may be within a range from 0.5% to 5% with respect to light having a wavelength of 380 nm to 450 nm. Since the diffuse reflectance of the second sensor part 242 is less than the diffuse reflectance of the first sensor part 142, it is possible to prevent the first sensor part 142 from excessively increasing diffuse reflectance or haze. In addition, as the second sensor part 242 has a mesh structure to achieve the small second area ratio, it is possible to minimize problems that may occur by an increase in specular reflectance. As such, it is possible to obviate a blackening treatment of the second sensor part 242 including metal particles, which may simplify, for example, the structure or manufacturing process. However, the embodiment of the present invention is not limited thereto, and, for example, the specular reflectance and diffuse reflectance of the second sensor part 242 may have various other values.

In addition, the second sensor part 242, which is formed of a metal layer filled with the second conductors 24a, may have a lower light transmissivity than the light transmissivity of the first sensor part 142. For example, the light transmissivity of the second sensor part 242 may be within a range from 87% to 91%. In the present embodiment, the second sensor part 242 has a mesh structure to achieve the small second area ratio, which may minimize a reduction in the light transmissivity of the conductive film 110 due to the second sensor part 242.

In addition, the first and second wiring parts 144 and 244 may have, for example, different materials and structures from those of the first and second sensor parts 142 and 242. More specifically, referring to (c) and (d) of FIG. 5, the first wiring part 144 includes metal particles 14b, which come into contact with one another so as to be densely distributed throughout the first wiring part 144. As such, the first wiring part 144 may have a higher filling density than that of the first sensor part 142 and a greater area ratio than the second area ratio of the second sensor part 242. Similarly, the second wiring part 244 may include metal particles 24b, which come into contact with one another so as to be densely distributed throughout the second wiring part 244. As such, the second wiring part 244 may have a higher filling density than that of the second sensor part 242 and a greater area ratio than the second area ratio of the second sensor part 242. For example, the first and second wiring parts 144 and 244 may respectively include the second conductors 24a included in the second sensor part 242 so as to have filling densities that are the same as or similar to that of the second sensor part 242, and may be formed throughout the area inside the outer edges of the first and second wiring parts 144 and 244 so as to have area ratios that are the same as or similar to the first area ratio of the first sensor part 142. With this structure, the first and second wiring parts 144 and 244 may have a sufficiently low resistance and excellent electrical characteristics, even if they are thin.

For example, the first and second wiring parts 144 and 244 may have filling densities that are the same as or similar to that of the second sensor part 242 (within a tolerance range of 10%), and may have area ratios similar to the first area ratio of the first sensor part 142 (within a tolerance range of 10%). That is, the first and second wiring parts 144 and 244 may have filling densities of 95% or more (for example, within a range from 99% to 100%), and may have area ratios within a range from 0.01% to 5% (for example, within a range from 0.01% to 2%). However, the embodiment of the present invention is not limited thereto, and the densities and area ratios of the first and second wiring parts 144 and 244 may have any other values.

The first and second wiring parts 144 and 244 may be formed by various methods. For example, in the case where the first and second wiring parts 144 and 244 include the same conductors as the second conductors 24a of the second sensor part 242, the first and second wiring parts 144 and 244 may be formed together in the process of forming the second sensor part 242. That is, an electrode layer is formed by applying a paste, which includes a photosensitive material and the second conductors 24a, via coating (for example, wet coating) throughout the other surface of the base film 10 and in the non-active area NA on one surface of the base film 10. The first and second wiring parts 144 and 244 may be subjected to patterning, along with the second sensor part 242, via the implementation of, for example, exposure, developing, and etching processes. Thereafter, the second sensor part 242 and the first and second wiring parts 144 and 244 may be formed together via thermal treatment. Alternatively, the second sensor part 242 and the first and second wiring parts 144 and 244 may be formed by applying a patterned paste and subsequently drying and/or firing the paste. In this way, the first and second wiring parts 144 and 244 may be formed via a simplified process.

In another example, the first wiring part 144 may be formed along with the first sensor part 142. For example, an electrode layer including the first conductors 14a is formed in the active area AA, and before or after the formation of the electrode layer, an electrode layer including the second metal particles 14b is formed in the non-active area NA. Thereafter, for laser patterning, the first sensor part 142 and the first wiring part 244 may be formed. In this case, the electrode layer, which is formed in the non-active area NA and includes the second metal particles 14b, may be formed by printing, for example, a paste. The paste may include a thermosetting resin, instead of the photosensitive material used in the paste to form the second sensor part 242 as described above. In addition, the second wiring part 244 may be formed along with the second sensor part 242 as described above.

However, the embodiment of the present invention is not limited thereto, and the first and/or second wiring parts 144 and 244 may be formed via a process that is different from that of the second sensor part 242. In addition, the first and second wiring parts 144 and 244 may have various shapes and include various conductive materials. For example, although the present embodiment illustrates the first and second sensor parts 142 and 242 and the first and second wiring parts 144 and 244 as having different structures, the first wiring part 144 and the first sensor part 142 may be formed into an integrated structure using the same material, and/or the second wiring part 244 and the second sensor part 242 may be formed into an integrated structure using the same material. For example, the first wiring part 144 may include the nano-material first conductors 14a in the same manner as the first sensor part 142. This may simplify the manufacturing process of forming the first sensor part 142 and the first wiring part 144. In this case, the first wiring part 144 is not located above the first sensor part 142. That is, the first sensor part 142 and the first wiring part 144 may be formed in the same plane above the base film 10, and the over-coating layer 16 may be formed to cover both the first sensor part 142 and the first wiring part 144.

A method for manufacturing the conductive film 110 and the touch panel 100 including the same as described above is as follows.

The first sensor part 142 is formed on one surface of the base film 10 including the first and second hard coating layers 12 and 22 (more specifically, on the first hard coating layer 12) by applying an ink or paste, used to form the first sensor part 142, and subsequently patterning the ink or paste using a laser or by wet etching. Thereafter, the second sensor part 242 is formed on the other surface of the base film 10 (more specifically, on the second hard coating layer 22) by applying a photosensitive paste, used to form the second sensor part 242, and subsequently patterning the paste. The first wiring part 144 may be formed before or after the formation of the first sensor part 142, or may be formed during the process of forming the first sensor part 142. The second wiring part 244 may be formed before or after the formation of the second sensor part 242, or may be formed during the process of forming the second sensor part 242. For example, the second sensor part 242 and the first and second wiring parts 144 and 244 may be formed together. The conductive film 110 may be manufactured in this way. Hereby, the material costs may be reduced and the manufacturing process may be simplified by providing the single conductive film 110 with both the first and second sensor parts 142 and 242.

In addition, the touch panel 100 may be manufactured by attaching the first and second printed circuit boards 19 and 29 and the transparent adhesive layer 120 to the conductive film 110, and attaching the cover substrate 130 to the transparent adhesive layer 120. In this way, the material costs may be reduced and the manufacturing process may be simplified because only the single transparent adhesive layer 120 is required to attach the single conductive film 110 and the cover plate 130 to each other.

FIG. 2 illustrates that the first sensor part 142 is located to face the cover substrate 130 and the second sensor part 242 is located at the opposite side of the cover substrate 130. As such, the second sensor part 242 located at the back side serves as a filter to prevent the diffuse reflections of the second sensor part 242, thereby effectively preventing problems due to the diffuse reflections of the first sensor part 142. In this case, superior visibility is realized. However, the embodiment of the present invention is not limited to thereto. The second sensor part 242 may be located to face the cover substrate 130, and the first sensor part 142 may be located at the opposite side of the cover substrate 130. Thereby, since the first sensor part 142 having a relatively high first area ratio is formed adjacent to a display panel (reference numeral 210 of FIG. 9), noise generated by the display panel 210 may be effectively shielded. Various other modifications are possible.

In the present embodiment, the second electrode 24 including the second sensor part 242 may be an electrode Tx to which a voltage is applied, and the first electrode 14 including the first sensor part 142 may be an electrode Rx which receives the applied voltage. Alternatively, the first electrode 14 including the first sensor part 142 may be an electrode Tx to which a voltage is applied, and the second electrode 24 including the second sensor part 242 may be an electrode Rx which receives the applied voltage. The drawing illustrates that the first electrode 14, which is formed in a long-axis to configure the electrode Tx to which a voltage is applied, includes the first conductors 14a which are metal nano-materials configuring a network structure, and the second electrode 24 includes the second conductors 14*b* formed of metal particles. However, the embodiment of the present invention is not limited thereto. Accordingly, the electrode Tx, which is formed in the long-axis such that a voltage is applied thereto, may serve as the second electrode 24 which has a relatively low sheet resistance so as to reduce line resistance, and the electrode Rx, which is formed in a short-axis to receive the applied voltage, may serve as the first electrode 14. Various other modifications are possible.

In the present embodiment, the neighboring second electrode 24, second hard coating layer 22, base film 10, first hard coating layer 12, first electrode 14, and over-coating layer 16 may come into contact with each other to make the structure as simple as possible. However, of course, the embodiment of the present invention is not limited thereto, and an additional layer may be provided between the neighboring layers.

Figure 6:
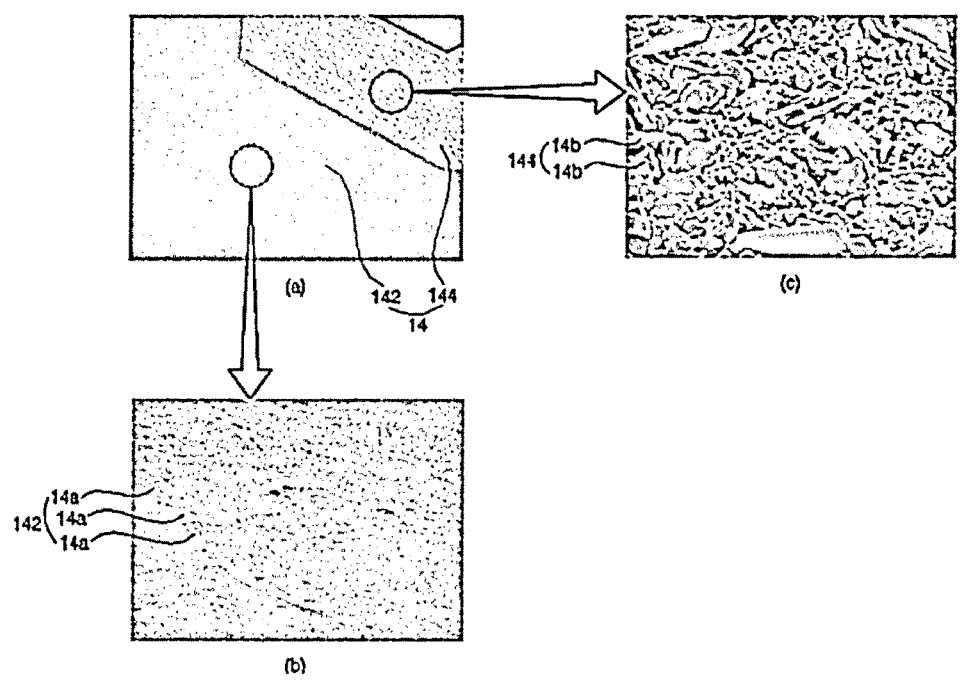
FIG. 6 is a photograph of a portion of a first electrode which may be applied according to the embodiment of the present invention.

The structures of the first electrode 14 including the first sensor part 142 and the first wiring part 144 and the second electrode 24 including the second sensor part 242 and the second wiring part 244, which may be applied to the touch panel according to the present embodiment, will be described below in more detail with reference to FIGS. 6 and 7. FIG. 6 is a photograph of a portion of the first electrode which may be applied according to the embodiment of the present invention, and FIG. 7 is a photograph of a portion of the second electrode which may be applied according to the embodiment of the present invention.

Referring to (a) of FIG. 6, it will be appreciated that the first electrode 14 including the first sensor part 142 and the first wiring part 144 is formed. Referring to (b) of FIG. 6 illustrating the first sensor part 142 in an enlarged scale, it will be appreciated that the first conductors 14*a* having a nano-wire shape are arranged to come into contact with one another at contact points. As illustrated, although some of the interior of the first sensor part 142 may be provided with the first conductors 14*a*, some of the interior of the first sensor part 142 may not be provided with the first conductors 14*a*. In addition, referring to (c) of FIG. 6 illustrating the first wiring part 144 in an enlarged scale, it will be appreciated that the entire first wiring part 144 is filled with the conductors formed of the metal particles 14*b*.

Figure 7:
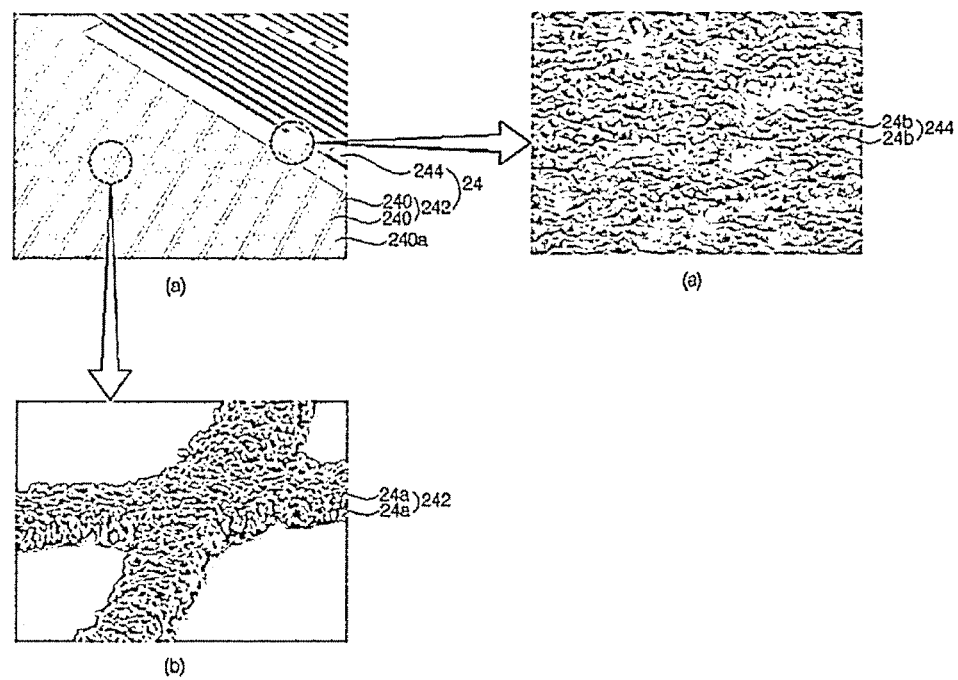
FIG. 7 is a photograph of a portion of a second electrode which may be applied according to the embodiment of the present invention.

Referring to (a) of FIG. 7, it will be appreciated that the first electrode 24 includes the second sensor part 242, which is provided with the electrode portions 240 and the openings 240*a*, and the second wiring part 244 connected to the second sensor part 242. Referring to (b) of FIG. 7 illustrating the second sensor part 242 in an enlarged scale, it will be appreciated that the portion in which the second sensor part 242 is formed (i.e. the inside of the electrode portions 240) is wholly filled with the second conductors 24*a* formed of metal particles. In addition, referring to (c) of FIG. 7 illustrating the second wiring part 244 in an enlarged scale, it will be appreciated that the entire second wiring part 244 is filled with the conductors formed of the metal particles 24*b*.

As described above, in the present embodiment, the first electrode 14 including the first sensor part 142 is formed on one surface of the base film 10 and the second electrode 24 including the second sensor part 242 is formed on the other surface of the same base film 10. As such, it is possible to reduce the number of base films 10 or conductive films 110 and to omit the adhesive layer for bonding the same, compared to the case where the first and second electrodes 14 and 24 are formed on different base films 10. This may minimize the thickness of the touch panel 100 and achieve reduced manufacturing costs and a simplified manufacturing process of the touch panel 100. At this time, the first sensor part 142 and the second sensor part 242 may have, for example, different structures and shapes to prevent problems caused when the first and second sensor parts 142 and 242 have the same structure and the same shape, which may result in an improvement in the characteristics of the touch panel 100.

For example, unlike the present embodiment, when both the first and second sensor parts 142 and 242 include the second conductors 24*a* in the form of metal particles and thus have a mesh structure to attain the second area ratio, it is difficult to effectively block noise generated from the display panel 210 when the resulting touch panel is applied to, for example, a display apparatus, which may cause, for example, malfunction, coordinate distortion, or breakage. In addition, the mesh structure may cause a moiré phenomenon and deteriorate the external appearance, and a small line width may deteriorate stability or consistency of mass-production, which may make it difficult to apply the touch panel to high-quality products. In addition, high specular reflectance requires the implementation of a blackening process, which may increase manufacturing costs. Alternatively, unlike the present embodiment, both the first and second sensor parts 142 and 242 include the nano-material first conductors 14*a* having a network structure, whereby the diffuse reflections of the first conductors 14*a* may cause a so-called milkiness phenomenon. In addition, it may be difficult to realize a sufficiently low resistance.

On the other hand, the first sensor part 142 and the second sensor 244 having, for example, different structures and shapes may effectively prevent the problems described above. For example, the moiré phenomenon of the second sensor part 242 may be minimized by the diffuse reflections of the first sensor part 142. In particular, as the second area ratio of the second sensor part 242, which has a low resistance due to the second conductors 24*a* included therein at a high filling density, is lower than the first area ratio of the first sensor part 142 which has a higher resistance due to the first conductors 14*a* included therein at a low filling density, problems caused by the second sensor part 242 may be effectively prevented. That is, the second sensor part 242 has a relatively low light transmissivity and relatively high specular reflectance instead of having the low resistance, and it is possible to prevent problems caused by the second sensor part 242 such as, for example, deterioration in light transmissivity and increase in specular reflectance by reducing the second area ratio of the second sensor part 242.

Hereinafter, a touch panel according to another embodiment of the present invention and a display apparatus including the touch panel according to the embodiment of the present invention will be described in detail. A detailed description related to contents that are the same as or similar to the above-described contents will be omitted and only contents that are difference will be described below in detail. The above-described embodiments and modifications that may be applied thereto as well as following embodiments and modifications that may be applied thereto may be combined with one another in various ways.

Figure 8:
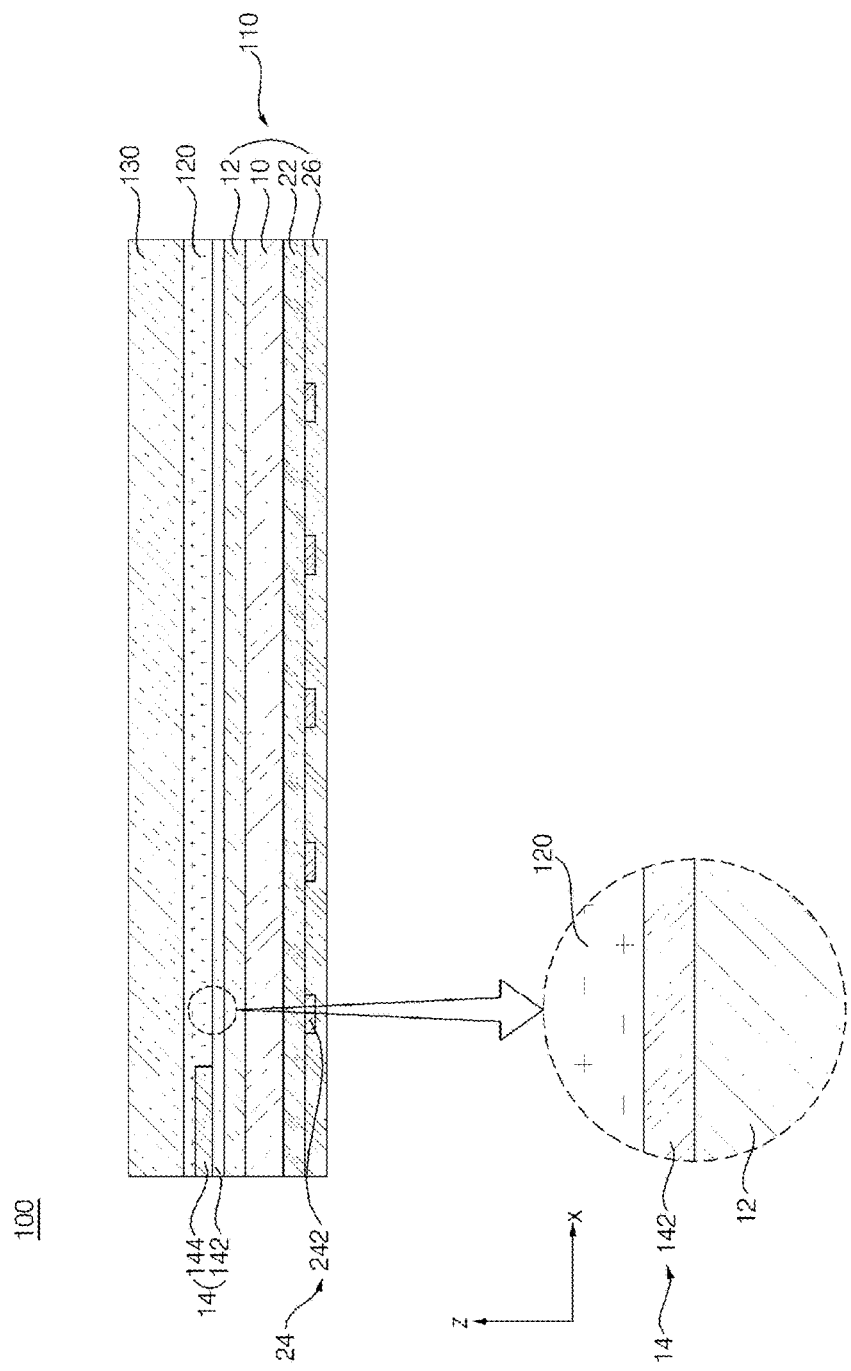
FIG. 8 is a sectional view illustrating a touch panel according to another embodiment of the present invention.

FIG. 8 is a sectional view illustrating a touch panel according to another embodiment of the present invention.

Referring to FIG. 8, in the conductive film 110 according to the present embodiment, the first sensor part 142 of the first electrode 14 may include a transparent conductive material, for example, a transparent conductive oxide (TCO). For example, the first sensor part 142 may include an indium tin oxide (ITO). At this time, the first sensor part 142 has, for example, a high filling density and hardness, and therefore no over-coating layer (reference numeral 16 of FIG. 2) is provided to cover the first sensor part 142. At this time, the first hard coating layer 12 may be provided below the first sensor part 142. As such, when the conductive film 110 is applied to the flexible or curved touch panel 100, the first hard coating layer 12 may prevent, for example, damage to the first sensor part 142 when the touch panel 100 is bent. However, the embodiment of the present invention is not limited thereto.

In the present embodiment, the first sensor part 142 may have a resistance equal to or higher than that of the first sensor part 142 including nano-materials according to the above-described embodiment. The resistance of the first sensor part 142 according to the present embodiment may be within a range from 10 Ω/sq. to 270 Ω/sq. This is because the resistance of the transparent conductive oxide is higher than that of the nano-materials. For example, the resistance of the first sensor part 142 according to the present embodiment may be within a range from 100 Ω/sq. to 270 Ω/sq. To reduce the resistance of the first sensor part 142, it is necessary to increase the thickness of the first sensor part 142 because the first sensor part 142 is brittle and is difficult to be applied to the touch panel 100 when the thickness thereof is increased. That is, it is possible to apply the first sensor part 142 to the flexible touch panel 100 when it has a resistance of 100 Ω/sq. or more.

For example, the thickness of the first sensor part 142 may be 200 nm or less (for example, within a range from 5 nm to 200 nm). When the thickness of the first sensor part 142 is below 5 nm, the resistance of the first sensor part 142 may increase. When the thickness of the first sensor part 142 exceeds 200 nm, it may be difficult to apply the first sensor part 142 to the flexible touch panel 100. Accordingly, the surface roughness of the first sensor part 142 has a value within the approximate range from 5 nm to 200 nm.

However, the embodiment of the present invention is not limited thereto, and, for example, the resistance, thickness, and surface roughness of the first sensor part 142 may have any other values.

The first sensor part 142 has a single layer structure in which the transparent conductive oxide, which forms the first conductors, is densely filled, and thus may have a high first area ratio and a filling density that is the same as or similar to that of the second sensor part 242. For example, the filling density of the first sensor part 142 may be 95% or more (for example, within a range from 99% to 100%), and the first area ratio may be 95% or more (for example, within a range from 99% to 100%). As such, the first sensor part 142, which has a single layer structure, includes no specific or particular shape of conductors.

In addition, the first sensor part 142 is not formed of a metal material, and thus has a lower specular reflectance (8° reflectance) and a lower diffuse reflectance (8° reflectance) than those of the second sensor part 242. For example, the specular reflectance of the first sensor part 142 may be within a range from 8% to 11% with respect to light having a wavelength of 380 nm to 780 nm, and the diffuse reflectance of the first sensor part 142 may be within a range from 0% to 3% with respect to light having a wavelength of 380 nm to 450 nm. However, the embodiment of the present invention is not limited thereto, and, for example, the specular reflectance and diffuse reflectance of the first sensor part 142 may have various other values.

The differences in characteristics between the first sensor part 142 and the second sensor part 242, concrete numerical values for which are not set forth, or which are not described separately in the above description, are identical to those in the description of the preceding embodiment. Thus, a detailed description thereof will be omitted herein.

At this time, the first sensor part 142, which has a higher resistance than that of the second sensor part 242, may be formed at the first area ratio, and the second sensor, which has a lower resistance than that of the first sensor part 142, may be formed at the second area ratio. As such, the first sensor part 142 and the second sensor part 242 may maintain excellent characteristics, thus improving the characteristics of the touch panel 100.

Figure 9:
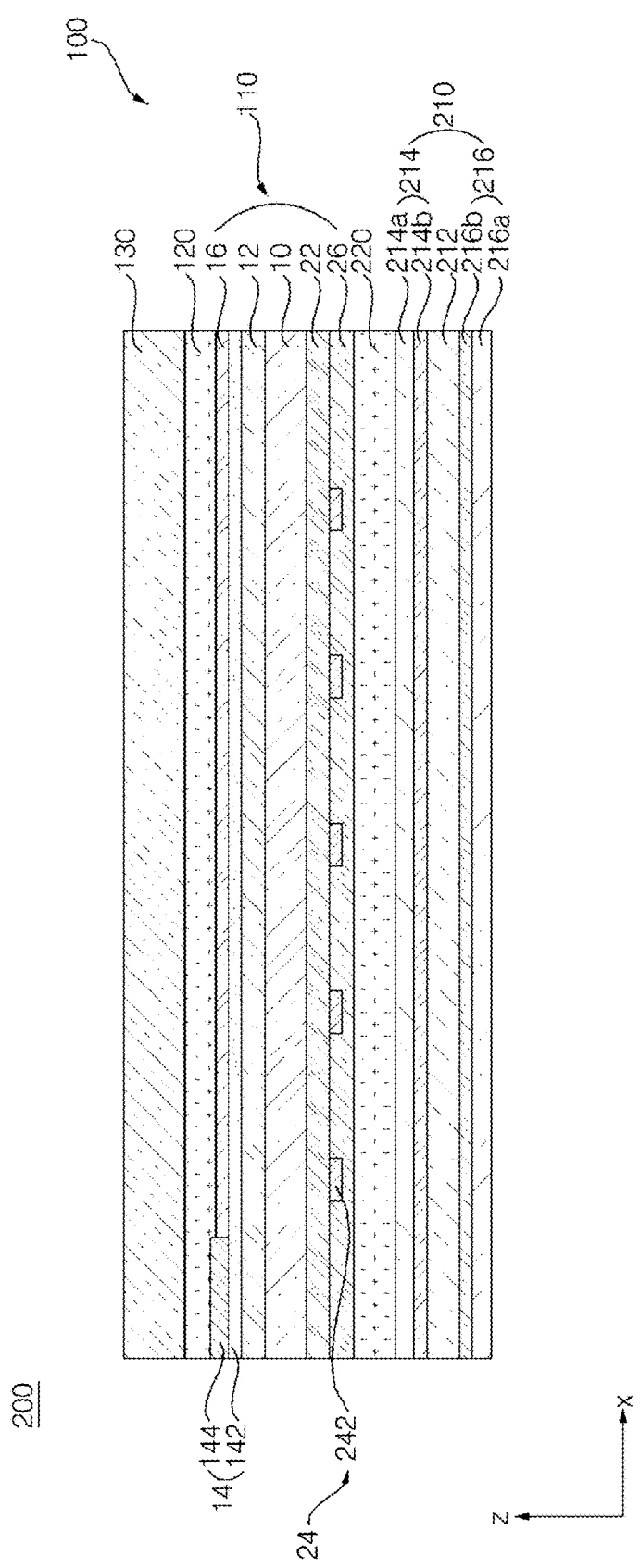
FIG. 9 is a sectional view illustrating a display apparatus according to one embodiment of the present invention.

FIG. 9 is a sectional view illustrating a display apparatus according to one embodiment of the present invention.

Referring to FIG. 9, the display apparatus, designated by reference numeral 200, according to the present embodiment may include a display panel unit 210 and the touch panel 100 integrated with the display panel unit 210. The display panel unit 210 may include a display panel 212 which substantially displays an image, a front substrate 214 disposed on the front surface of the display panel 212, and a rear substrate 216 disposed on the rear surface of the display panel 212. The display panel unit 210 may further include, for example, a backlight unit to provide the display panel 212 with light and a drive unit to drive the display panel 212.

The display panel 212 may be any one of various structures of panels which are capable of displaying an image. For example, the display panel 212 may be a liquid crystal display (LCD) panel. Since the display panel 212 may have any of various structures and be operated in various manners, the embodiment of the present invention is not limited thereto.

The front substrate 214 may include a transparent substrate 214a and a polarizer 214b attached to the top of the transparent substrate 214a (more specifically, to the inner surface of the transparent substrate 214a). The polarizer 214b serves to polarize light so as to display a desired image. The polarizer 214b may have any of various structures and be operated in various ways to polarize light. However, the embodiment of the present invention is not limited thereto, and various other films excluding the polarizer 214b may be disposed on the front substrate 214.

The rear substrate 216 may include a transparent substrate 216a and a polarizer 216b attached to the top of the transparent substrate 216a (more specifically, to the inner surface of the transparent substrate 216a). The polarizer 216b serves to polarize light so as to display a desired image. The polarizer 216b may have any of various structures and be operated in various ways to polarize light. However, the embodiment of the present invention is not limited thereto, and various other films excluding the polarizer 216b may be disposed on the front substrate 216.

In the present embodiment, the touch panel 100 is disposed on the entire front surface of the display panel unit 210, and an adhesive layer 220 is interposed between the touch panel 100 and the display panel unit 210 to attach the same to each other. As the first and second conductive films 10 and 20 of the touch panel 100 and the adhesive layer 220 are disposed on the front substrate 214 of the display panel unit 210, the touch panel 100 may be integrated with the display panel unit 210 in an on-cell form. At this time, respective surfaces of the adhesive layer 220 may come into contact with the rear surface of the touch panel 100 and the front surface of the display panel 210.

Figure 10:
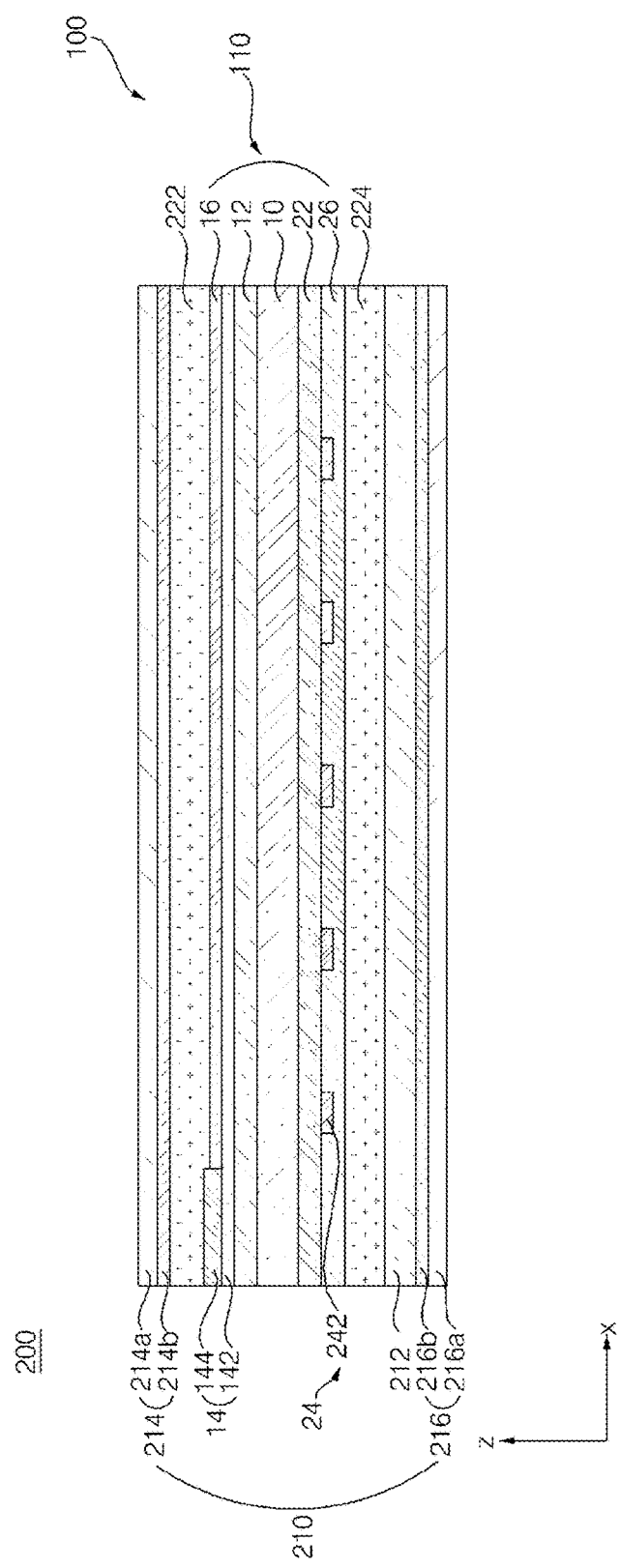
FIG. 10 is a sectional view illustrating a display apparatus according to another embodiment of the present invention.

FIG. 10 is a sectional view illustrating a display apparatus according to another embodiment of the present invention.

Referring to FIG. 10, the display apparatus 200 according to the present embodiment may include the display panel unit 210 and the touch panel 100 integrated with the display panel unit 210. At this time, the description related to the display panel unit 210 with reference to FIG. 9 may be directly applied to the display panel unit 210, and a detailed description of the display panel unit 210 will be omitted herein.

In the present embodiment, the front substrate 214 may be disposed on the front surface of the touch panel 100, and the display panel 212 and the rear substrate 216 may be disposed on the rear surface of the touch panel 100. At this time, a first adhesive layer 222 may be interposed between the touch panel 100 and the front substrate 214 to attach the same to each other, and a second adhesive layer 224 may be interposed between the touch panel 100 and the display panel 212 to attach the same to each other. As the touch panel 100 is located inside the display panel unit 210, the touch panel 100 may be integrated with the display panel unit 210 in an in-cell form.

Although FIGS. 9 and 10 illustrate the touch panel 100 as having the structure of FIG. 2, the embodiment of the present invention is not limited thereto, and the touch panel 100 may have any of various structures. In addition, although the touch panel 100 is illustrated as being integrated with the display panel unit 210 using the adhesive layer(s) 220; 222 and 224, various other modifications are possible. For example, a spacer may be interposed between the touch panel 100 and the display panel unit 210 such that the touch panel 100 and the display panel unit 210 are fixed to each other with an air gap therebetween.

As is apparent from the above description, in the present embodiment, a first electrode including a first sensor part may be formed on one surface of a base film, and a second electrode including a second sensor part may be formed on the other surface of the same base film. As such, it is possible to reduce the number of base films or conductive films and to omit adhesive layers for bonding therebetween. In this way, the thickness of a touch panel may be minimized, and the touch panel may be manufactured in a simplified process at reduced manufacturing costs. At this time, as a result of providing the first sensor part and the second sensor part with, for example, different configurations and shapes, any problems caused when the first and second sensors have the same configuration and the same shape are overcome, which may result in the improved characteristics of the touch panel.

The above described features, configurations, effects, and the like are included in at least one of the embodiments of the present invention, and should not be limited to only one embodiment. In addition, the features, configurations, effects, and the like as illustrated in each embodiment may be implemented with regard to other embodiments as they are combined with one another or modified by those skilled in the art. Thus, content related to these combinations and modifications should be construed as being included in the scope and spirit of the invention as disclosed in the accompanying claims.

What is claimed is:

1. A touch panel comprising:
    a base film;
    a first electrode formed on one surface of the base film, the first electrode being provided with a first sensor part including a first conductor; and
    a second electrode formed on the other surface of the base film, the second electrode being provided with a second sensor part including a second conductor different from the first conductor,
    wherein the first sensor part has a higher resistance than a resistance of the second sensor part,
    wherein a first area ratio, which is a ratio of an area, in which the first sensor part is formed, to an area inside an outer edge of the first sensor part is greater than a second area ratio, which is a ratio of an area, in which the second sensor part is formed, to an area inside an outer edge of the second sensor part,
    wherein the first conductor includes a metal nano-material configuring a network structure,
    wherein the touch panel further comprises a first hard coating layer located between the base film and the first electrode,
    wherein the first electrode includes a residual portion having a smaller thickness than a thickness of the first conductor, the residual portion containing a resin, and
    wherein the touch panel further comprises an over-coating layer disposed on the first electrode, the over-coating layer having a smaller thickness than a thickness of the first hard coating layer and being configured to enclose and cover the first conductor protruding upward from the residual portion.

2. The touch panel according to claim 1, wherein the first conductor within the first sensor part has a lower filling density than a filling density of the second conductor within the second sensor part.

3. The touch panel according to claim 1, wherein the first conductor includes a transparent conductive oxide, and
    wherein the second conductor includes metal particles.

4. The touch panel according to claim 1, wherein the first conductor has a width within a range from 10 nm to 35 nm and a length within a range from 20 μm to 40 μm, and
    wherein the second conductor has a diameter within a range from 100 nm to 300 nm.

5. The touch panel according to claim 1, wherein the first conductor includes a plurality of nano-wires as the metal nano-material, and having a plurality of contact points, and
    wherein the number of the contact points of the first conductor within the first sensor part is 1,000 per mm$^2$ or more.

6. The touch panel according to claim 1, wherein the first sensor part has a sheet resistance within a range from 10 Ω/sq. to 270 Ω/sq., and
    wherein the second sensor has a sheet resistance within a range from 1 Ω/sq. to 50 Ω/sq.

7. The touch panel according to claim 1, wherein the first sensor part is formed, without an opening, in the entire area inside the outer edge of the first sensor part, and
    wherein the second sensor part includes a plurality of electrode portions crossing each other at intersections such that at least one opening is formed in the area inside the outer edge of the second sensor part.

8. The touch panel according to claim 7, wherein the first area ratio is 95% or more, and
    wherein the second area ratio is within a range from 0.01% to 5%.

9. The touch panel according to claim 7, wherein the number of the intersections, at which the electrode portions cross each other, in the second sensor part is within a range from 3 to 50 per mm$^2$.

10. The touch panel according to claim 1, wherein the first sensor part is thinner than the second sensor part.

11. The touch panel according to claim 10, wherein the first sensor part has a thickness of 200 nm or less, and
    wherein the second sensor part has a thickness within a range from 0.5 μm to 2 μm.

12. The touch panel according to claim 1, wherein the first sensor part has a smaller surface roughness than a surface roughness of the second sensor part.

13. The touch panel according to claim 1, wherein the first sensor part has a smaller specular reflectance than a specular reflectance of the second sensor part.

14. The touch panel according to claim 13,
wherein the first sensor part has a greater diffuse reflectance than a diffuse reflectance of the second sensor part.

15. The touch panel according to claim 1, wherein the first sensor part has a higher transmissivity than a transmissivity of the second sensor part.

16. The touch panel according to claim 15, wherein the transmissivity of the first sensor part is within a range from 88% to 92%, and
wherein the transmissivity of the second sensor part is within a range from 87% to 91%.

17. The touch panel according to claim 1, wherein the first electrode includes a first wiring part connected to the first sensor part,
wherein the second electrode includes a second wiring part connected to the second sensor part, and
wherein the first and second wiring parts have higher filling densities than that of the first sensor part and greater area ratios than the second area ratio.

18. The touch panel according to claim 1, further comprising a second hard coating layer located between the base film and the second electrode.

19. The touch panel according to claim 1, further comprising an insulation layer configured to cover the second electrode,
wherein the insulation layer has a smaller dielectric coefficient than a dielectric coefficient of the over-coating layer.

20. The touch panel according to claim 1, further comprising:
a cover substrate disposed on a front surface of the touch panel; and
a transparent adhesive layer disposed between the touch panel and the cover substrate to bond the touch panel to the cover substrate.

21. A conductive film for a touch panel, the conductive film comprising:
a base film;
a first electrode formed on one surface of the base film, the first electrode being provided with a first sensor part including a first conductor; and
a second electrode formed on the other surface of the base film, the second electrode being provided with a second sensor part including a second conductor different from the first conductor,
wherein the first sensor part has a higher resistance than a resistance of the second sensor part,
wherein a first area ratio, which is a ratio of an area, in which the first sensor part is formed, to an area inside an outer edge of the first sensor part is greater than a second area ratio, which is a ratio of an area, in which the second sensor part is formed, to an area inside an outer edge of the second sensor part,
wherein the first conductor includes a metal nano-material configuring a network structure,
wherein the conductive film for the touch panel further comprises a first hard coating layer located between the base film and the first electrode,
wherein the first electrode includes a residual portion having a smaller thickness than a thickness of the first conductor, the residual portion containing a resin, and
wherein the conductive film for the touch panel further comprises an over-coating layer disposed on the first electrode, the over-coating layer having a smaller thickness than a thickness of the first hard coating layer and being configured to enclose and cover the first conductor protruding upward from the residual portion.

22. A display apparatus comprising:
a display panel; and
a touch panel integrated with the display panel,
wherein the touch panel includes:
a base film;
a first electrode formed on one surface of the base film, the first electrode being provided with a first sensor part including a first conductor; and
a second electrode formed on the other surface of the base film, the second electrode being provided with a second sensor part including a second conductor different from the first conductor,
wherein the first sensor part has a higher resistance than a resistance of the second sensor part,
wherein a first area ratio, which is a ratio of an area, in which the first sensor part is formed, to an area inside an outer edge of the first sensor part is greater than a second area ratio, which is a ratio of an area, in which the second sensor part is formed, to an area inside an outer edge of the second sensor part,
wherein the first conductor includes a metal nano-material configuring a network structure,
wherein the touch panel further comprises a first hard coating layer located between the base film and the first electrode,
wherein the first electrode includes a residual portion having a smaller thickness than a thickness of the first conductor, the residual portion containing a resin, and
wherein the touch panel further comprises an over-coating layer disposed on the first electrode, the over-coating layer having a smaller thickness than a thickness of the first hard coating layer and being configured to enclose and cover the first conductor protruding upward from the residual portion.

23. The display apparatus according to claim 22, wherein the touch panel is located at a front side of the display panel, or located inside the display panel.

* * * * *